Figure 1:
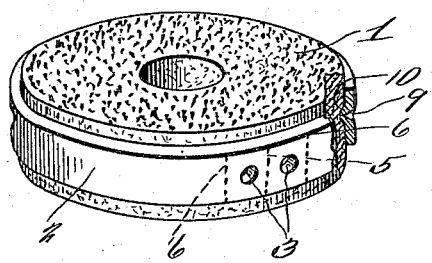

W. BICKER.
REINFORCEMENT BAND FOR MILLSTONES OR MILL BURS.
APPLICATION FILED MAR. 16, 1914.

1,168,705.    Patented Jan. 18, 1916.

Witnesses
A. R. Wolfe,
Francis G. Braswell

Inventor
William Bicker,
By D. Swift & Co.,
his Attorneys

UNITED STATES PATENT OFFICE.

WILLIAM BICKER, OF WHITE EARTH, NORTH DAKOTA.

REINFORCEMENT-BAND FOR MILLSTONES OR MILL-BURS.

1,168,705.

Specification of Letters Patent.

Patented Jan. 18, 1916.

Application filed March 16, 1914. Serial No. 824,964.

*To all whom it may concern:*

Be it known that I, WILLIAM BICKER, a citizen of the United States, residing at White Earth, in the county of Mountrail and State of North Dakota, have invented a new and useful Reinforcement-Band for Millstones or Mill-Burs; and I do hereby declare the following to be a full, clear, and exact description of the invention, such as will enable others skilled in the art to which it appertains to make and use the same.

This invention relates to a device and a method for strengthening and reinforcing a mill-stone or mill-bur.

An object of the invention is the provision of a steel band or ring designed to be heated red hot and shoved or forced over the millstone or bur and allowed to cool off, the same shrinking, thereby affording a secure reinforcing bond. The band or bond, however, is provided with a pair of adjacent apertures. After this bond has been so arranged, and the millstone or bur becomes unavoidably broken, the bond will act to hold the broken parts of the stone or bur together. However, to hold the broken parts more secure, the band or ring is severed, in any suitable manner by means of a cold chisel or hack saw, at a point between said apertures, then the ends having said apertures are bent at right angles to the band, and a bolt is inserted through the apertures, and the band or bond is drawn securely about the stone or bur, thereby rendering the same as firm and substantial as it was in the first instance.

The details of construction may necessitate alterations, falling within the scope of what is claimed.

The invention comprises further features and combination of parts, as hereinafter set forth, shown in the drawings and claimed.

Figure 2:
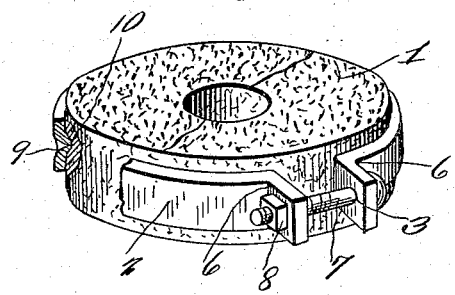
Figure 3:
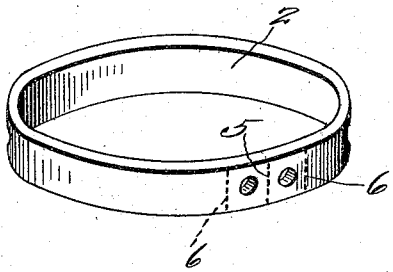
Figure 4:
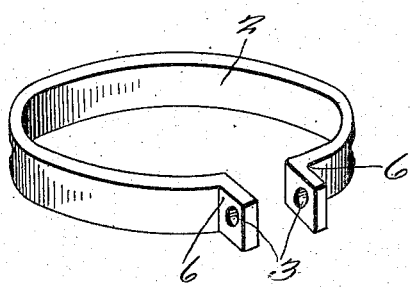

In the drawings: Figure 1 is a perspective view of a millstone or bur constructed in accordance with the invention, showing the stone before the same becomes broken. Fig. 2 is a similar view, showing the construction of the band after the stone or bur has become broken. Fig. 3 is a perspective view of the band before it is severed. Fig. 4 is a perspective view of the band showing its construction after the same is severed.

Referring more especially to the drawings, 1 designates the millstone or bur, about which the circular band or ring 2 is arranged. This band is provided with a pair of apertures 3. The band is heated to a red heat, and fitted to the stone, and allowed to shrink. In this manner the band affords a secure reinforcing bond, gripping the stone. When the stone or bur becomes broken or cracked, as shown in Fig. 2, a cold chisel or hack saw is utilized for cutting or severing the band at the junction 5 between said apertures. The severed ends of the band are bent at right angles at the junctions or scores 6, thereby forming ears, through the apertures of which a bolt 7 having a nut 8 is passed. By tightening the nut on the bolt the band is drawn tight and securely about the broken parts of the stone or bur, thereby binding them tightly together. In this way the stone is rendered firm and substantial and secure, as in the first instance.

At the time the band is fitted to the stone while it is in the red heat, any suitable tool is used for forming depressions 9 in the band, which engage corresponding depressions 10 in the stone, thereby affording additional means to prevent the band from slipping after the same cools off and shrinks.

The invention having been set forth, what is claimed as new and useful is:—

1. A device for repairing millstone comprising a circular metal band having a pair of spaced apart apertures, and being scored in three places adjacent to and alternating with the apertures to indicate where the band may be cut and bent, said band being fitted to the stone, thereby constituting means for affording a secure bond.

2. A method for repairing millstones, which first consists in severing a band while on the millstone intermediate two apertures of the band, then bending the severed ends at points beyond said apertures, and connecting the severed bent ends and drawing the band tight about the stone.

In testimony whereof I have signed my name to this specification in the presence of two subscribing witnesses.

WILLIAM BICKER.

Witnesses:
K. E. EDWARDSON,
EDMOND ORNING.

Copies of this patent may be obtained for five cents each, by addressing the "Commissioner of Patents, Washington, D. C."